Sept. 22, 1970     F. F. POLIZZANO     3,530,019
APPARATUS AND METHOD FOR MAKING LAMINATED CABLE SHEATH
Filed May 28, 1968
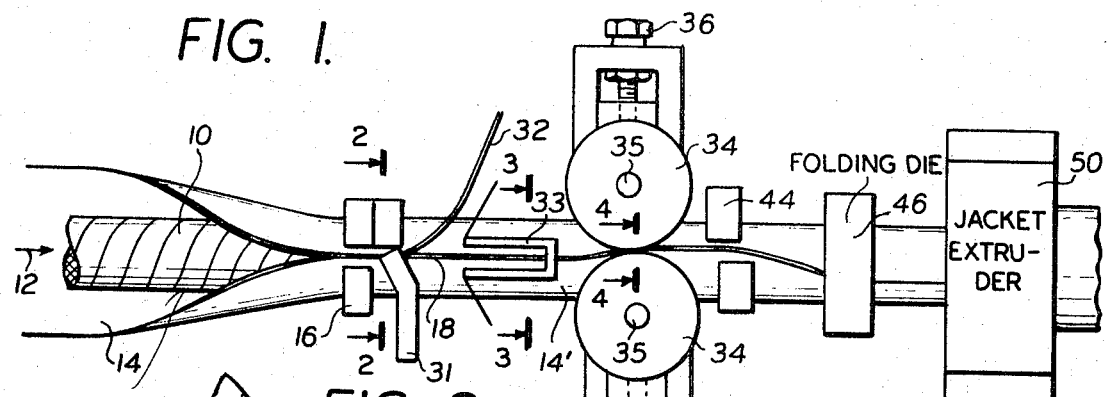
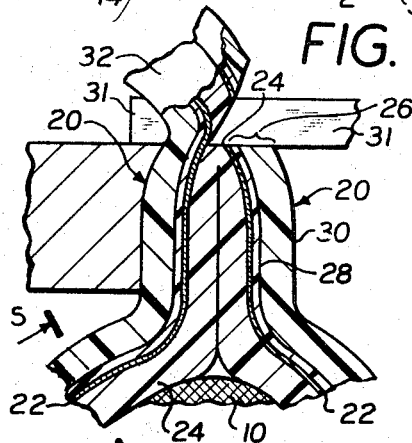
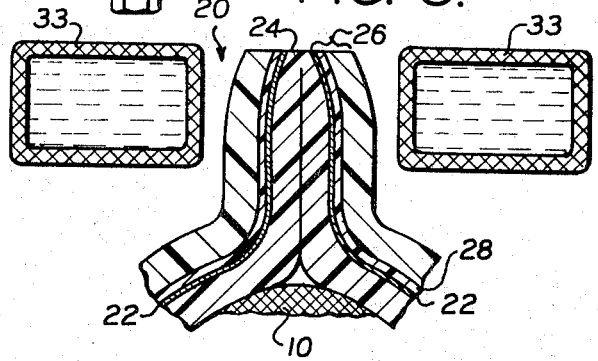
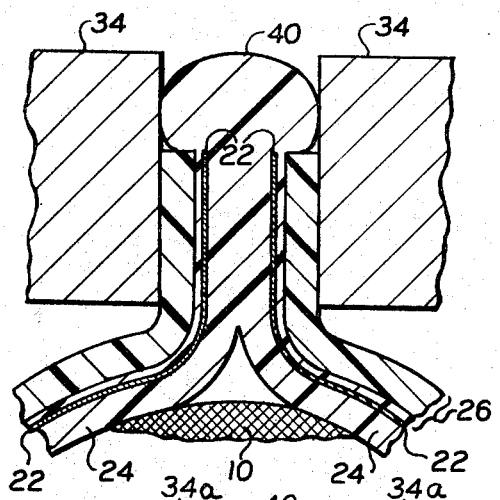
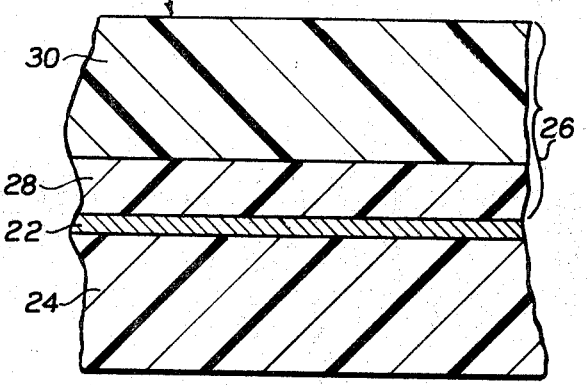
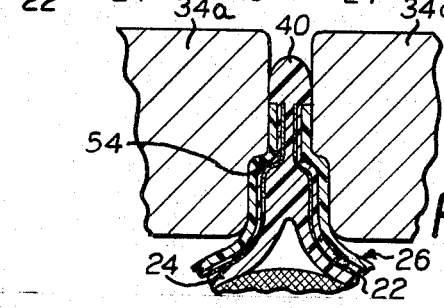
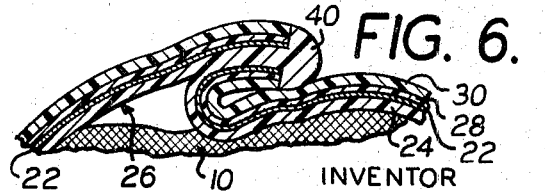
INVENTOR
FRED F. POLIZZANO
BY
ATTORNEYS.

United States Patent Office 3,530,019
Patented Sept. 22, 1970

3,530,019
APPARATUS AND METHOD FOR MAKING LAMINATED CABLE SHEATH
Fred F. Polizzano, Allendale, N.J., assignor to General Cable Corporation, New York, N.Y., a corporation of New Jersey
Filed May 28, 1968, Ser. No. 732,753
Int. Cl. H01b 13/26
U.S. Cl. 156—54          8 Claims

ABSTRACT OF THE DISCLOSURE

Electrical cable sheaths are commonly made by folding longitudinally, around a cable core, a laminated tape having a center lamination of metal and plastic laminations on both sides of the metal lamination. The edges of the strip are bent up to form tabs which are sealed together by heat and pressure. This invention has rolls that seal the confronting faces of the tabs together with the heat and pressure correlated to squeeze plastic from between the tabs outward and over top edges of the metal laminate to protect these edges from corrosion. One modification of the invention has rolls with steps for applying different pressure at different levels of the tabs in accordance with different temperatures of the plastic.

BACKGROUND AND RELATED PATENTS

This invention relates to electrical cables having sheaths or inner jackets with tabs such as disclosed in Jachimowicz Pat. 3,206,541, issued Sept. 14, 1965. Unless the context indicates otherwise, the terms "jacket" and "sheath" will be used interchangeably herein.

When the edges of laminated tapes having a center metal laminate are bent up and trimmed along a seam of a longitudinally folded, generally tubular jacket, the edges of the metal are exposed, and it is important to protect them by plastic which can be flowed over these exposed edges as in the cable disclosed in Pat. 3,206,541. This invention provides apparatus and methods for making cables of the kind shown in that patent.

Another related invention is that of the applicant's Pat. No. 3,485,689 issued Dec. 23, 1969.

SUMMARY OF THE INVENTION

This invention provides improved apparatus and methods for making longitudinally seamed cables that have a laminated jacket with upstanding tabs bonded together across their confronting faces to prevent entry of water or vapor into the cable.

As described in the patent referred to above, the top edges of the bent-up tabs are trimmed to make them even. This leaves bare edges of metal, and it is these bare edges over which coating material is extruded from the sides of the tabs. The plastic is preferably heated to a temperature high enough so that when it is extruded across the tab edge from one side it bonds to the coating on the other side of the metallic layer to form a continuous coating. Preferably the softening temperature of the plastic coating on one surface of the metallic layer is lower than that on the other surface.

The apparatus for making the improved cable of this invention has means for heating the plastic coating next to the metal and/or between the tabs to a flowable temperature without fusing the outside surface of the plastic on the outside of the sheet. In the preferred embodiment, this heating is done by use of induction or high frequency heating that generates heat in the metallic layer quickly so that plastic in contact with the heated metal is heated to a flowable or fused condition before the outer circumference of the coated sheet is fused or excessively softened.

The invention includes the apparatus and method of making this improved product.

Other objects, features and advantages of the invention will appear or will be pointed out as the description proceeds.

BRIEF DESCRIPTION OF DRAWING

In the drawings forming a part hereof, in which like reference characters indicate corresponding parts in all the views:

FIG. 1 is a diagrammatic top plan view of apparatus for sealing a cable jacket in accordance with this invention;

FIG. 2 is a greatly enlarged, sectional view taken on the line 2–2 of FIG. 1 and showing the way in which the bent-up edges are trimmed off even with a knife;

FIGS. 3 and 4 are greatly enlarged, sectional views taken on the lines 3–3 and 4–4, respectively, of FIG. 1;

FIG. 5 is a sectional view, on a greatly enlarged scale, through the laminated jacket material, the section being taken on the line 5–5 of FIG. 2;

FIG. 6 is an enlarged sectional view through the seam after the tabs have been folded over by the folding die of FIG. 1, and FIG. 7 is a view similar to FIG. 4, but showing a modification of the invention.

An electric cable core 10 is advanced longitudinally in the direction indicated by the arrow 12; and a laminated strip 14 is bent around the core by a forming die 16 which bends the edge portions of the strip 14 upwardly and brings them together to form a longitudinal seam 18 with upstanding tabs 20, as shown in FIG. 2. This is a conventional operation well understood in the art.

The strip 14 has a metallic layer, such as aluminum foil 22, which is the vapor impervious component of the strip, best shown in FIG. 5. The foil 22 is coated on both sides by a plastic coating, preferably a polyolefin coating and in the preferred construction this includes a coating 24 on the inside surface of the foil and a coating 26 on the outside surface of the foil. The inner coating 24 preferably is a copolymer of polyethylene modified by monomers containing reactive carboxyl groups which give the desired bonding characteristics. The coating 24 may be said to be "chemically bonded" to the foil or metal layer 22.

The outer coating 26 is preferably a composite coating made in two layers. These layers include a layer 28 "chemically bonded" to the metallic layer 22 and preferably made of the same low density copolymer as the coating 24. An outer layer 30 preferably is made of higher density polyethylene which has a higher melting point than the low density copolymers of the coating 24 and the layer 28. This layer 30 is bonded to the underlying layer 28.

In the construction illustrated, the metallic layer 22 has a thickness of 0.0007″. The inner coating 24 has a thickness of 0.005″. The outer coating 26 has a thickness of 0.007″, of which 0.002″ is the thickness of the layer 28 and 0.005″ is the thickness of the layer 30. These figures are given merely by way of illustration. Different thicknesses can be used and the materials can be equivalents of those described, or other materials which are suitable on electric cable sheaths.

The strip 14 provides a liquid and vapor impervious sheath around the core 10, and as provided by this method, the plastic coating of the jacket not only makes the seam substantially vapor-impervious. but also protects the edges of the metallic layer with the continuous plastic coating across the seam.

In conventional methods for jacketing electric cables the tabs bent upwardly along the seam are quite often not of the same height. The forming die does not form the strip so perfectly as to maintain even edges at the tops of the tabs and this invention provides a knife 31, or other trimming means, for trimming the upper ends of the tabs 20 so as to bring the edges of both of the tabs even with one another.

The knife 31 is thermostatically heated and controlled to provide a continuous tack by superficial melting and fusing of the copolymer as the freshly cut edge passes along the hot knife surface. FIG. 2 illustrates this phenomenon by the discontinuance of the line delineating opposing copolymer films where it approaches the knife face. This continuous superficial seal or tack holds the edges in "as-cut alignment" during the following heating and rolling phases to allow for uniform formation of the extrudate. This leaves a raw exposed edge of the metallic layer 22 at the top of the tabs 20. The waste trimmed off by the knife 31 is indicated in FIGS. 1 and 2 by the reference character 32.

Beyond the trimming station at which the knife 31 is located, the formed tube or jacket 14' passes a high frequency induction coil 33, which is preferably water cooled and formed to extend along both sides of the upturned seam, as shown in FIG. 3. This high frequency induction coil 33 causes heat to be generated in the metallic layer 22 and this heat raises the temperature of the inner coating 24 and the layer 28 of the outer coating which is in contact with the metal layer 22.

The heating is continued until the coating 24 and coating layer 28 reach a flowable temperature. This may be a fusion temperature, or a softening temperature somewhat below actual fusion. The heating is accomplished quickly so that there is not sufficient time for the heat to travel through the layer 28 and to soften or melt the outside surface of the layer 30. The layer 30 having a higher softening and melting temperature than the layer 28 makes it practical to heat the layer 28 to a flowable and bonding temperature without having the control of the process critical.

Emerging from the induction coil 33, the tabs 20 pass between rolls 34. These rolls are supported by axles 35 which are adjustable by lead screws 36 to bring the rolls 34 toward and from one another to control the pressure which they exert against the tabs 20. The rolls 34 are adjusted so that they squeeze the tabs 20 together with sufficient force to extrude flowable material of the inner coating 24 from between the tabs into a lead 40, as shown in FIG. 4.

Plastic flow is restricted to the top of the tab due to the thermal gradient that exists in the tab as it moves through the squeeze rolls 34. The thermal gradient develops as the thermal conductivity of the laminate drains heat from the bottom of the tab and dissipates it through a large surface area of the strip and the cable core. Therefore, plastic flow takes place in the direction of least resistance, i.e. towards the hotter material at the top of the tab. As the plastic flows out from within the tab it flows together to form the bead 40 by surface tension effect. An appreciable improvement in the uniformity of the tab configuration is achieved by a modification of the working surface of the squeeze rolls as shown in FIG. 7. In this figure squeeze rolls 34a have a step 54 machined into the peripheral surface of each of the squeeze rolls 34a. Each step measures about one-half the thickness of the material of the bent-up edge portion which contacts with that roll.

This simple modification allows for measure and control of the amount of squeeze required for adhesion at the colder, lower portion of the tab. The upper, hotter end of the tab then fills the space provided between the rolls which is controlled by the lower tab in a uniform fashion.

In another modification of the squeeze rolls, the surface of the rolls may be embossed to reproduce the embossment on the tab for mechanical and/or working effects.

The pressure of the rolls 34 against the outside coating 26 of the tabs 20 also extrudes some of the low density copolymer of the layer 28 from between the metallic layer 22 and the outer layer 30. This adds additional material to the bead 40 which merges with the material of the bead which has been extruded from the inner coating 24 to form a continuous, one-piece mass of merged copolymer that coacts the exposed edges of the metal layer 22. Thus the continuous one-piece coating extends from the inner coating 24 across the upper edges of the metal layer 22 and down the other side of the metal layer.

The temperature of the bead 40, when originally extruded, is high enough to bond the material to the edges of the metallic layer 22. There is no problem of trapping air under the bead because the operation is progressive and the bead is formed along the edges of the tabs as the jacketed cable moves continuously in a longitudinal direction.

The tabs 20 are bonded together at their confronting faces by the fusing of the low density copolymer of the coating 24 on these confronting faces.

Beyond the rolls at the sealing station, the seam passes a stabilizing die 44 and then through a folding die 46 which bends the tabs over so that one of the tabs is bent back against the circumference of the tubular jacket 14' and the other tab overlies the bent back tab and is parallel to it as shown in FIG. 6. This is a conventional operation in making jacketed cables. Beyond the folding die, the jacketed cable passes through an outer jacket or sheath extruder 50 which is also of conventional construction.

The preferred embodiment of the invention has been illustrated and described, but changes and modifications can be made, and some features can be used in different combinations without department from the invention as defined in the claims.

What is claimed is:

1. Apparatus for making sheathed electric cable having a core surrounded by a longitudinally folded laminated strip which is formed into a longitudinal seam tube enclosing the core, the strip having a metallic layer and plastic coating on both sides of the metallic layer, said apparatus including, in combination, forming means for progressively bending the strip into a tube around the core with upstanding tabs along the edge portions of the seam, heating means along the path of longitudinal travel of the tabs, pressure means beyond the heating means and through which the tabs pass, the pressure means including elements closely spaced and on opposite sides of the tabs for moving the tabs closer together and squeezing out some of the coating from between the tabs to form a bead that covers the edges of the tabs, the elements of the pressure means having a step therein at an intermediate level of the height of said elements whereby the elements have greater clearance between them below the step than above and exert greater pressure on the tabs above the level of the step and other forming means that fold the tabs down against the circumference of the formed tube.

2. The apparatus described in claim 1 characterized by said elements of the pressure means including rolls between which the tabs of the tube pass with the edges of the tabs at the top thereof, each of the rolls having a step therein at an intermediate level of the height of the roll, the roll being of greater diameter above the step than below said step whereby the rolls have greater clearance between them below the steps than above and exert greater pressure on the tabs above the level of the steps.

3. The apparatus described in claim 2 characterized by the difference in diameter of each of the rolls above and below said step being equal to about one-half of the thickness of the material of the bent-up edge portion which contacts with that roll.

4. The apparatus described in claim 2 characterized by the face of at least one of the rolls being embossed to reproduce the embossment on the tab with which the roll contacts.

5. The method of sealing the longitudinal edges of a laminated electric cable sheath that has a metallic layer coated on both sides with plastic and formed into a longitudinal seam tube with the edge portions of the seam bent upwardly to form confronting tabs that have the inside coating on their circumferential surfaces bonded together, which method comprises heating the coating on at least one side of the metallic layer to a flowable temperature, then passing the tabs longitudinally to a pressure station, applying transverse pressure to the coated tabs at the pressure station, applying transverse pressure to the coated tabs at the pressure station with sufficient force to extrude a portion of the flowable coating and to cause it to spread over the edges of the tabs.

6. The method of sealing described in claim 5 characterized by heating the coating between the tabs to a flowable temperature, and passing the tabs through the pressure station with the edges of the tabs at the top so that the flowable coating extrudes due to the pressure and thermal gradient to form the protective bead at the top edges of the tabs.

7. The method of sealing described in claim 5 characterized by heating the coated tabs by induction heating to generate heat in the metallic layer, effecting the heating quickly to a degree that softens the coating in contact with the metallic layer to a flowable temperature, and terminating the heating before the outside of the coating on the tabs flows.

8. The method of sealing described in claim 5 characterized by cutting off the coated tabs with a thermostatically controlled heated knife to an even height progressively along the length of the seam to leave bare edges of metal exposed at the upper ends of the tabs, and by said transverse pressure at said pressure station extruding flowable coating material over the full width of the bare edges.

References Cited

UNITED STATES PATENTS

| 3,206,541 | 9/1965 | Jachimowicz | 156—54 X |
| 3,321,572 | 5/1967 | Garner | 156—54 X |

FOREIGN PATENTS 451,708   10/1948   Canada.

VERLIN R. PENDEGRASS, Primary Examiner